W. H. PILANT.
Apparatus for Defecating Cane-Juice.
No. 210,556.   Patented Dec. 3, 1878.
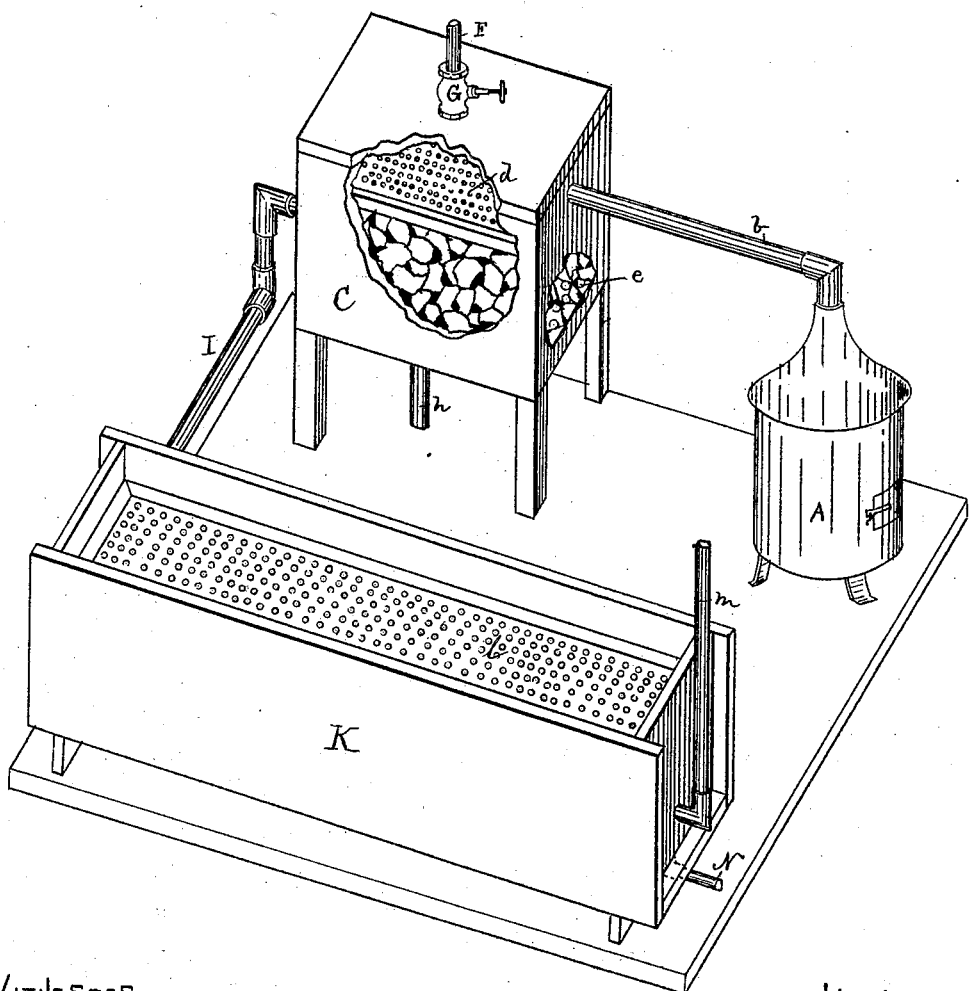

UNITED STATES PATENT OFFICE.

WILLIAM H. PILANT, OF POINT COUPEE, LOUISIANA.

IMPROVEMENT IN APPARATUS FOR DEFECATING CANE-JUICE.

Specification forming part of Letters Patent No. 210,556, dated December 3, 1878; application filed June 15, 1878.

*To all whom it may concern:*

Be it known that I, WILLIAM H. PILANT, a resident of Point Coupee, parish of Point Coupee, and State of Louisiana, have invented a certain new and useful Improvement in Apparatus for Defecating Cane-Juice; and I do hereby declare the following to be a full, clear, and correct description of the same, reference being had to the annexed drawing, making a part of this specification.

My invention will be readily understood by referring to the accompanying drawing, whereon—

A represents a furnace, in which sulphur is burned, and from which the fumes pass through a pipe, $b$, into an air-tight reservoir, C, which I denominate a "scrubber and washer." The latter is provided with upper and lower perforated trays, $d\ e$, arranged at short distances from the top and bottom of the reservoir, and filled in between each with pieces of broken chalk, brick, or any other suitable absorbent material.

F is a pipe, through which water is admitted to the upper tray. This tray is provided, as before stated, with perforations, in order that the water may fall in a shower, or rain through the sulphur fumes, and thus the more thoroughly remove their impurities, and purifying the same.

The flow of water is regulated by a valve, G, which enables the attendant to keep the upper tray constantly full, and thus prevent the escape of gas through its perforations.

By reason of a draft, created as will be hereinafter mentioned, the fumes are drawn downward through the chalk, &c., which absorbs all impurities not removed by the water.

By gravity the water descends to the bottom of the reservoir, from whence it escapes through a pipe, as shown at $h$. The gas in the meantime is conveyed through a pipe, I, to one end of a juice receiver or defecator, K, which is made rectangular in form, and provided, at a few inches below its top, with a perforated diaphragm, $l$, upon which the juice falls from the mill. The juice overspreads this diaphragm, and is strained by passing through its perforations into the bottom of the receiver, in which it is, owing to its diffused condition in the form of a shower, brought into contact with the purified fumes, and thus defecated.

The aforesaid fumes or gas passes off through the pipe $m$, in which a draft may be created, if necessary, by connecting therewith a steam-jet pipe.

N is a pipe, through which the juice is finally withdrawn from the apparatus.

Having described my invention, what I claim as new, and desire to secure by Letters Patent, is—

The apparatus, substantially as hereinbefore described, for defecating cane-juice, consisting of the combination of a furnace, A, pipe $b$, scrubber and washer C, having perforated trays $d\ e$, and absorbent filling, with water-supply pipe F, and outlet $h$, connecting-pipe I, and juice-receiver K.

In testimony whereof I have hereunto signed my name.

WILLIAM H. PILANT.

In presence of—
 A. P. MALROUDEAUX,
 C. D. HEBERT.